US012687394B2

(12) United States Patent
Gund

(10) Patent No.: US 12,687,394 B2
(45) Date of Patent: Jul. 21, 2026

(54) APPARATUS AND METHOD FOR ADJUSTING ELASTICITY OF A SPRING-MASS SYSTEM

(71) Applicant: Honeywell International Inc., Charlotte, NC (US)

(72) Inventor: Ved Gund, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 311 days.

(21) Appl. No.: 18/520,095

(22) Filed: Nov. 27, 2023

(65) Prior Publication Data

US 2025/0172392 A1 May 29, 2025

(51) Int. Cl.
*G01C 19/16* (2006.01)
*G01C 19/32* (2006.01)
*G01C 19/5712* (2012.01)
*G01C 25/00* (2006.01)

(52) U.S. Cl.
CPC ............. *G01C 19/16* (2013.01); *G01C 19/32* (2013.01); *G01C 19/5712* (2013.01); *G01C 25/005* (2013.01)

(58) Field of Classification Search
CPC .... G01C 19/16; G01C 19/32; G01C 19/5712; G01C 25/005; G01C 19/5649
See application file for complete search history.

(56) References Cited

U.S. PATENT DOCUMENTS

| | | | |
|---|---|---|---|
| 7,522,029 B1 * | 4/2009 | Lantz | .................... H01H 61/01 337/393 |
| 8,681,409 B2 | 3/2014 | Frank et al. | |
| 9,029,823 B2 * | 5/2015 | Hewak | .............. H10N 70/8828 257/3 |
| 9,383,285 B2 | 7/2016 | Phan et al. | |
| 9,493,344 B2 | 11/2016 | Horning et al. | |
| 2011/0038093 A1 | 2/2011 | Furukawa et al. | |
| 2019/0025056 A1 * | 1/2019 | Hughes | .............. G01C 19/5712 |
| 2020/0158506 A1 | 5/2020 | Rochus et al. | |
| 2023/0212002 A1 | 7/2023 | Melnikov et al. | |

FOREIGN PATENT DOCUMENTS

| | | | |
|---|---|---|---|
| CN | 109211218 A | 1/2019 | |
| CN | 110864687 A | 3/2020 | |
| KR | 20140123260 A | * 10/2014 | ............. G01C 19/56 |

OTHER PUBLICATIONS

English Machine Translation of Kim (KR 10-2014-0123260) (Year: 2014).*
Jadhav et al., "HZO-based FerroNEMS MAC for In-Memory Computing", Applied Physics Letters, vol. 121, No. 19 2022, pp. 1 through 9.

(Continued)

*Primary Examiner* — David Z Huang
(74) *Attorney, Agent, or Firm* — Fogg & Powers LLC

(57) ABSTRACT
Apparatuses and methods are provided for compensating for an error in an inertial sensor such as a gyroscope. An error signal can be extracted and used to generate a compensation signal including a voltage applied to variable elasticity material on or over a spring-mass system or components thereof.

19 Claims, 6 Drawing Sheets

(56) References Cited

OTHER PUBLICATIONS

Jadhav et al., "Programmable Ferroelectric HZP NEMS Mechanical Multiplier for In-Memory Computing", 2023 IEEE 36th International conference on Micro Electro Mechanical Systems (MEMS), Munich Germany, Jan. 15-19, 2023, pp. 519 through 521.

Strnad,et al., "Atomic Layer Deposition and Sputtering of Piezoelectric Thin Films for Improved IMU Performance", 2023 IEEE/ION Position, Location and Navigation Symposium (PLANS), IEEE, 2023, as downloaded Nov. 23, 2023 from IEEE Xplore, pp. 10 through 17.

Tatar et al., "Quadrature-Error Compensation and Corresponding Effects on the Performance of Fully Decoupled MEMS Gyroscopes", Journal of Microelectromechanical Systems, vol. 21, No. 3, Jun. 2012, pp. 656 through 667.

Great Britain Intellectual Property Office, "Patents Act 1977: Search Report under Section 17(5)", dated Apr. 30, 2025, from GB Application No. GB2416117.6, from Foreign Counterpart to U.S. Appl. No. 18/520,095, pp. 1 through 3, Published: GB.

* cited by examiner

From Controller 217

| | |
|---|---|
| Second Electrode 226 | |
| VEM 224 | |
| First Electrode 222 | |

204 t

Beam 202 and/or Moveable Mass 203

228

From Controller 217

| |
|---|
| Second Electrode 226 |
| Second VEM 224B |
| Third Electrode 229 |
| First VEM 224A |
| First Electrode 222 |

204'

From Controller 217

Beam 202 and/or Moveable Mass 203

228

440

Apply Voltage between Movable Mass and Fixed Electrode
442

Change Distance between Electrically Conductive Surfaces of
The Movable Mass and The Fixed Electrode 443

Generating A Measurement Signal
444

Obtain Error Signal
445

Using Error Signal, Determine Voltage of Compensating Signal
446

Provide Voltage of Compensation Signal
447

<u>550</u>

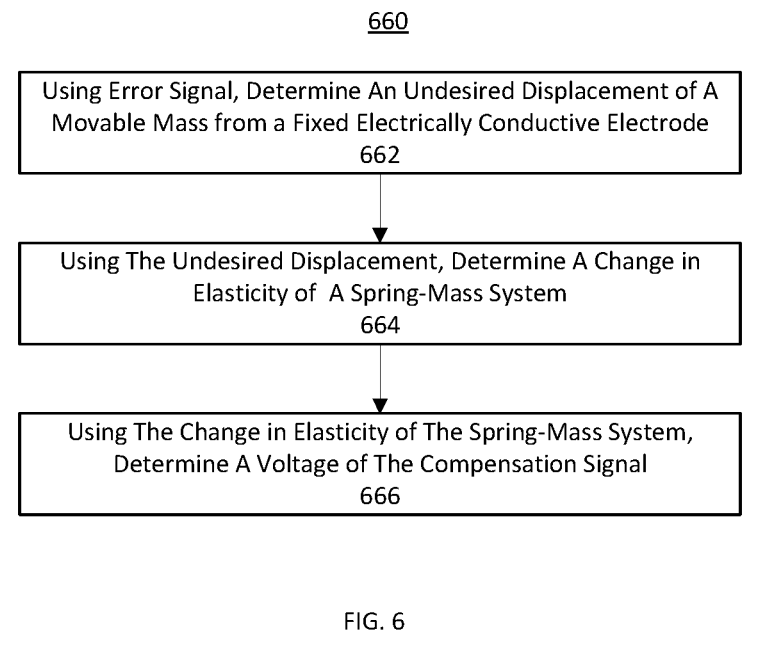

660

Using Error Signal, Determine An Undesired Displacement of A
Movable Mass from a Fixed Electrically Conductive Electrode
662

Using The Undesired Displacement, Determine A Change in
Elasticity of A Spring-Mass System
664

Using The Change in Elasticity of The Spring-Mass System,
Determine A Voltage of The Compensation Signal
666

FIG. 6

APPARATUS AND METHOD FOR ADJUSTING ELASTICITY OF A SPRING-MASS SYSTEM

BACKGROUND

A microelectromechanical system (MEMS) gyroscope can measure rate of rotation around an axis (of the MEMS gyroscope) using Coriolis acceleration. To do so, the MEMS gyroscope includes a spring-mass system. Non-uniformities in the MEMS gyroscope, e.g., in the spring-mass system, give rise to a quadrature-phase signal. An output of the MEMS gyroscope provides both a sense rate and the quadrature-phase signal. The quadrature-phase signal is in-phase with an input to the MEMS gyroscope and ninety degrees out of phase to the sense rate. A rate of rotation of the MEMS gyroscope around the axis is equal to the sense rate or is derived from the sense rate. However, when the quadrature-phase signal is present at the output of the MEMS gyroscope, the quadrature-phase signal causes an error in the rotation rate and diminishes sensitivity of the MEMS gyroscope. Heating of and/or removal of material from the MEMS gyroscope, e.g., the spring-mass system, have been used to diminish the undesired quadrature-phase signal. However, such processing only diminishes the quadrature-phase signal for a limited time period.

SUMMARY

In some aspects, the techniques described herein relate to an error compensated gyroscope configured to measure rotation rate around an axis, the error compensated gyroscope including: a gyroscope including: a substrate; a spring including a first end and a second end, wherein the first end is opposite the second end, wherein the first end is attached to the substrate, and wherein the spring includes at least one spring surface; a movable mass including at least one surface including a first electrically conductive surface, and wherein the movable mass is attached only to the second end, wherein the second end is only attached to the movable mass; a variable elasticity material structure (VEMS) on or over at least one of a surface of the spring and a surface of the movable mass; wherein the variable elasticity material structure includes variable elasticity material, and first and second VEMS electrically conductive electrodes; a fixed electrically conductive electrode attached to the substrate including a second electrically conductive surface, wherein the first electrically conductive surface is adjacent and opposite the second electrically conductive surface and is separated from the second electrically conductive surface by a variable distance, wherein the first and the second electrically conductive surfaces form a capacitor; and a voltage source configured to provide a constant voltage across the first and the second electrically conductive surfaces; and an error correction system including: a current sensor electrically coupled in series with the voltage source and the capacitor; and a controller including a variable voltage supply and configured to: receive a measurement signal from the current sensor, wherein the measurement signal includes an in-phase component and a quadrature-phase component; extract the quadrature-phase component from the measurement signal; using the quadrature-phase component, determine a compensation signal voltage; and provide the compensation signal voltage to the first and the second VEMS electrically conductive electrodes.

In some aspects, the techniques described herein relate to a method for compensating for an error signal in a gyroscope, the method including: obtaining a quadrature-phase signal derived from a measurement signal received from a current sensor coupled in series with a capacitor and a voltage source, wherein the capacitor is formed by a first electrically conductive surface of a movable mass, including at least one surface, and including a second electrically conductive surface of a fixed electrically conductive electrode attached to a substrate, wherein the first and the second electrically conductive surfaces are opposite and adjacent to one another and separated from one another by a variable distance, wherein the movable mass is attached only to a second end of a spring, wherein the second end is only attached to the movable mass, wherein a first end of the spring is opposite the second end, wherein the first end is attached to the substrate, wherein the spring includes at least one spring surface, and wherein a variable elasticity material structure (VEMS) includes a variable elasticity material and first and second VEMS electrically conductive electrodes and is on or over at least one of a surface of the spring and a surface of the movable mass; using the quadrature-phase signal, determining a compensation signal voltage; and providing the compensation signal voltage to the first and the second VEMS electrically conductive electrodes.

In some aspects, the techniques described herein relate to an apparatus configured to resonate at more than one frequency, the apparatus including: a substrate; a beam including a first end and a second end, wherein the first end is opposite the second end, wherein the first end is attached to the substrate, wherein the beam includes at least one beam surface; a movable mass only attached to the second end and including at least one mass surface, wherein the second end is only attached to the movable mass; and a variable elasticity material structure including: at least one of phase change material and ferroelectric material on or over at least one of a surface of the beam and a surface of the movable mass; and two electrically conductive electrodes, on at least one surface of the at least one phase change material and ferroelectric material and configured to receive an electrical voltage that is constant or variable.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 6 illustrates a flow diagram of one embodiment of a method of determining a voltage of a compensation signal using an error signal.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
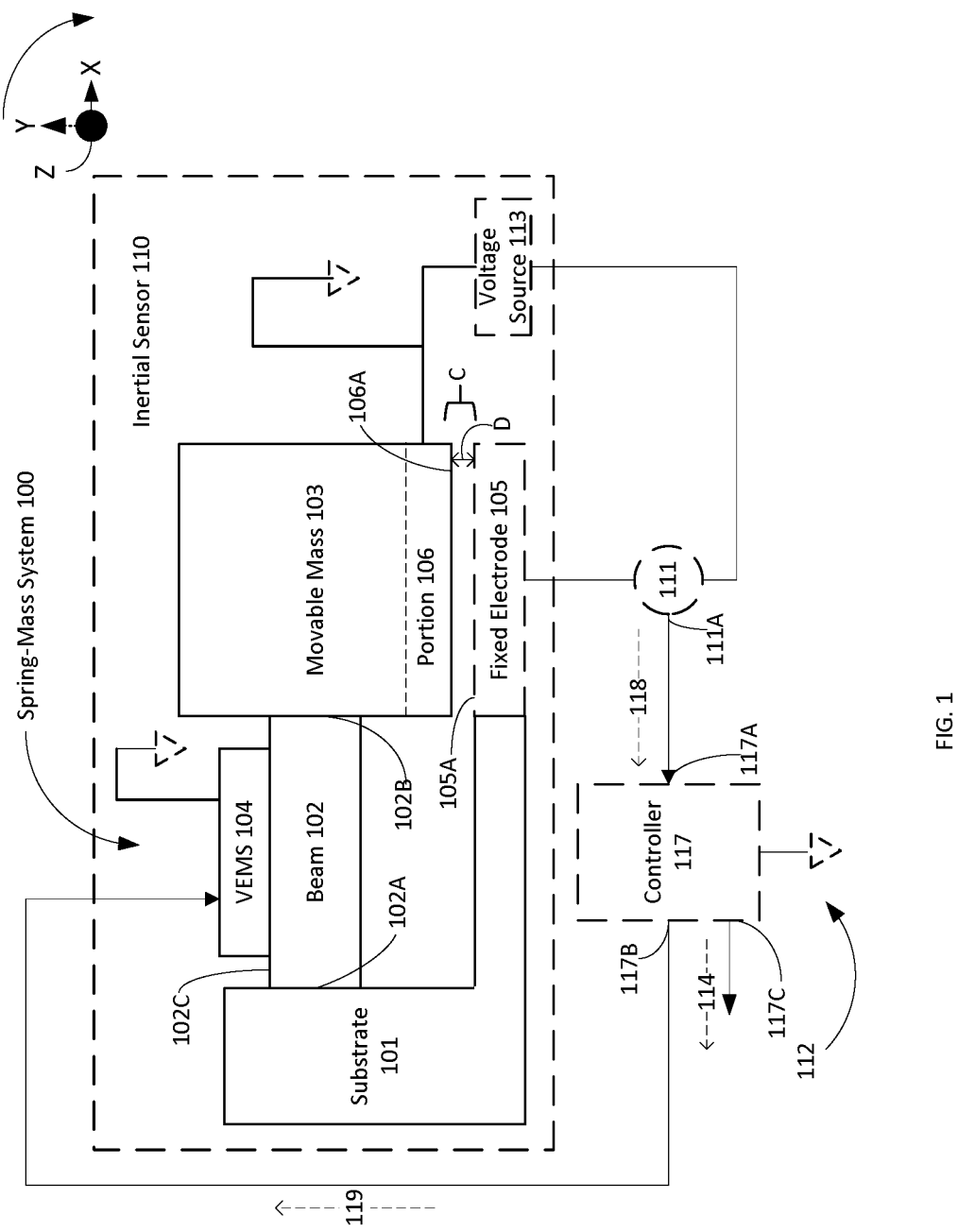
FIG. 1 illustrates a block diagram of a spring-mass system 100 including a variable elasticity material.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, each method presented in the drawing figures and the specification is not to be construed as limiting the order in which the individual steps may be performed. The following detailed description is not to be taken in a limiting sense.

A spring-mass system includes at least one spring and a movable mass. Optionally, the spring may be a beam. For pedagogical purposes, the spring is illustrated herein as a beam.

An optional sensor includes a spring-mass system and an electrically conductive electrode. Optionally, the sensor is a gyroscope, e.g., a MEMS gyroscope. An optional error correction system is electrically coupled to a capacitor formed by the sensor and is configured to generate a compensation signal including an electrical voltage.

The spring-mass system includes a variable elasticity material on at least one surface of the spring and/or the movable mass of the spring-mass system. Two conductive electrodes are each on the same or different surfaces of the variable elasticity material.

The two conductive electrodes are configured to receive the compensation signal including the electrical voltage. When the electrical voltage of the compensation signal is applied to the two conductive electrodes, the elasticity of the variable elasticity material changes. Thus, the Young's modulus (or elasticity) of the spring-mass system changes. The change in elasticity of the spring-mass system diminishes an amplitude of an error signal, e.g., the quadrature-phase signal, provided by the sensor, e.g., the MEMS gyroscope. By diminishing the amplitude of the error signal, the signal to noise ratio of a desired signal, e.g., an in-phase signal, provided by the inertial sensor is increased for longer time periods than the techniques described above.

FIG. 1 illustrates a block diagram of a spring-mass system 100 including a variable elasticity material structure 104. The elasticity of the variable elasticity material structure 104 may be varied by adjusting a direct current (DC) voltage or an alternating current (AC) voltage applied across at least one surface of the variable elasticity material structure 104. For example, a DC voltage can be applied to variable elasticity material structure 104 that is phase change material and an AC voltage can be applied to variable elasticity material structure 104 that is ferroelectric material. Optionally, the elasticity of the variable elasticity material structure 104 can be modified to diminish an error signal, e.g., a quadrature-phase signal, in a sensor, e.g., a gyroscope (for example a MEMS gyroscope).

The spring-mass system 100 includes a substrate 101, a beam 102, and a movable mass 103. The beam 102 functions as a spring. The beam 102 includes a first end 102A and a second end 102B. The first end 102A is opposite the second end 102B. The first end 102A is mechanically connected, e.g., attached, to the substrate 101. The beam 102 includes at least one beam surface 102C.

The movable mass 103 is only attached to the second end 102B of the beam 102. The second end 102B of the beam 102 is only attached to the movable mass 103.

Figure 2A:
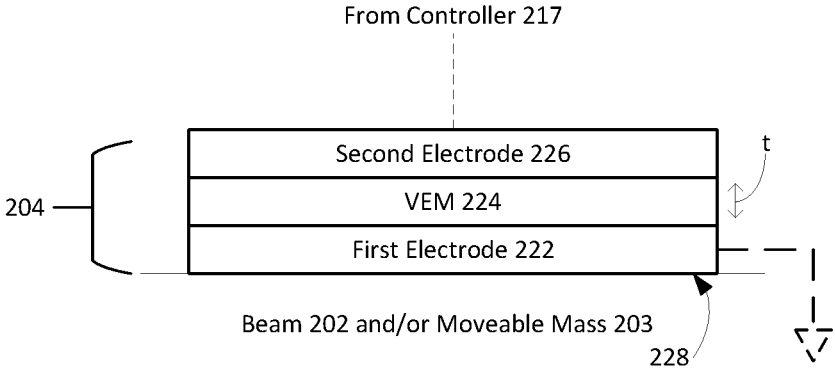
FIG. 2A illustrates a cross sectional diagram of one embodiment of the variable elasticity material structure.

A variable elasticity material structure (VEMS) 104 is on or over a beam surface and/or a movable mass surface. FIG. 2A illustrates a cross sectional diagram of one embodiment of the variable elasticity material structure 204. The variable elasticity material structure 204 includes at least one material whose elasticity may be altered (variable elasticity material or VEM), e.g., a phase change material and/or a ferroelectric material. Examples of phase change material include germanium telluride and germanium-antimony-tellurium. Examples of ferroelectric material include hafnium zirconium oxide and scandium aluminum nitride. The variable elasticity material structure 104 also includes a first electrically conductive electrode (or first electrode) 222 and a second electrically conductive electrode (or second electrode) 226 each of which are on the same or different surfaces of the variable elasticity material 224. The variable elasticity material 224 has a thickness t as measured from opposite surfaces of the variable elasticity material 224 each of which is adjacent to respectively the first electrically conductive electrode 222 or the second electrically conductive electrode 226.

The variable elasticity material structure 204 is mounted on or over at least one surface 228 of the beam 202 and/or the movable mass 203.

The two conductive electrodes are configured to receive, e.g., from a subsequently described controller 217, an electrical AC or DC voltage. When the electrical voltage is applied to the two conductive electrodes, the elasticity of the variable elasticity material changes in a manner related to the electrical voltage level. As a result, the Young's modulus (or elasticity) of the spring-mass system is altered. FIG. 2A illustrates only one embodiment of a variable elasticity material structure 104. The first and second conductive electrodes may be formed in alternate ways in the variable elasticity material structure 104.

Figure 2B:
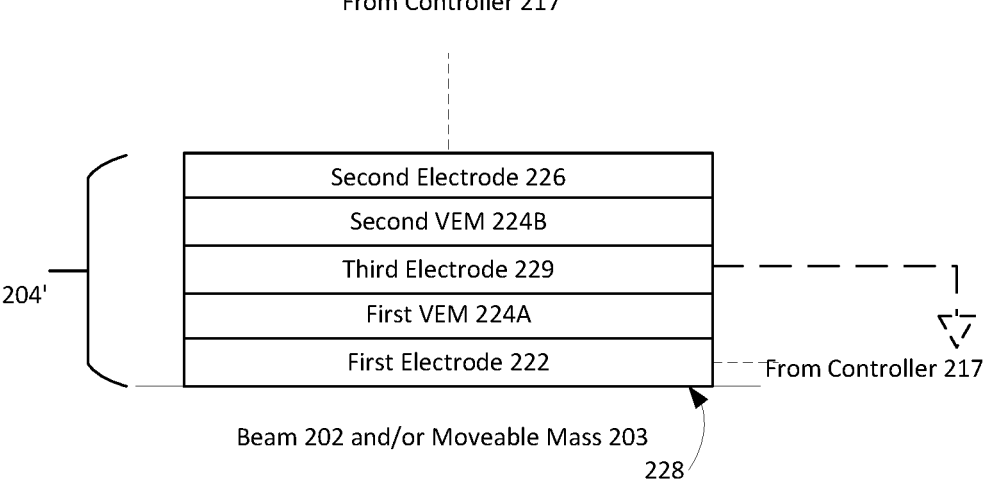
FIG. 2B illustrates a cross sectional diagram of another embodiment of the variable elasticity material structure.

FIG. 2B illustrates a cross sectional diagram of another embodiment of the variable elasticity material structure 204'. FIG. 2B is similar to FIG. 2A except that the variable elasticity material structure 204 includes a first variable elasticity material 224A and a second variable elasticity material 224B. The first variable elasticity material 224A is between a surface of the first electrically conductive electrode 222 and a surface of a third electrically conductive electrode 229. The second variable elasticity material 224B is between a surface of the second electrically conductive electrode 226 and a surface of the third electrically conductive electrode 229. Optionally, the variable elasticity material 224, the first variable elasticity material 224A, and/or the second variable elasticity material 224B may be phase change material and/or ferroelectric material. Optionally, a compensation signal 119 (subsequently described) may include a first control signal including a first control voltage and a second control signal including a second control voltage. The first control voltage may be provided to the first and the third electrically conductive electrodes 222, 229. The second control voltage may be provided to the second and the third electrically conductive electrodes 226, 229.

Returning to FIG. 1, an inertial sensor 110 includes the spring-mass system 100, a fixed electrically conductive electrode (or fixed electrode) 105, and an optional voltage source 113. An inertial sensor means a sensor configured to measure rate of rotation and/or acceleration in at least one axis. For example, the inertial sensor may be a gyroscope or an accelerometer.

The optional voltage source 113 is configured to provide an AC or DC voltage whose level(s), e.g., peak voltage levels, are constant. Optionally, the voltage source 113 is configured to provide a DC voltage level greater than zero volts. The optional voltage source 113, an optional electrical sensor 111 (subsequently described), and a capacitor C (subsequently described) are electrically coupled in series.

The fixed electrically conductive electrode 105 has an electrically conductive surface 105A. Optionally, the movable mass 103 or a portion 106 of the movable mass is electrically conductive. The movable mass 103 when electrically conductive or electrically conductive portion 106 thereof has an electrically conductive surface 106A which is opposite the electrically conductive surface 105A of the fixed electrically conductive electrode 105. The electrically conductive surface of the fixed electrically conductive electrode 105 and the electrically conductive surface of the movable mass 103 are opposite and adjacent to one another, form a capacitor C whose capacitance is dependent upon a distance D between each electrically conductive surface 105A, 106A.

Optionally, an error correction system (or error correction circuit) 112 is electrically coupled to the inertial sensor 110. The optional error correction system 112 includes an optional electrical sensor 111 and an optional controller (or controller circuitry) 117.

Optionally, the optional electrical sensor 111 is a current sensor or a voltage sensor. When a current sensor, the optional electrical sensor 111 is configured to measure current flowing through the capacitor C. The optional electrical sensor 111 provides a measurement signal 118, e.g., representative of the current flowing through the capacitor C. A measurement output 111A of the electrical sensor 111 is electrically coupled to a controller input 117A of the controller 117. The controller 113 is configured to generate compensation signal 119, e.g., a control voltage, provided at an error correction controller output 117B of the controller 117. The error correction controller output 117B is electrically coupled to the variable elasticity material structure 104. The level, e.g., the voltage level, of the compensation signal 119 (e.g., the control voltage) is configured to control the elasticity of the variable elasticity material structure 104, and thus the spring-mass system 100. By this technique, the compensation signal 119 can diminish the error signal, e.g., the quadrature phase signal, of the inertial sensor 110, e.g., the gyroscope.

Optionally, the controller 117 also includes a desired signal output 117C configured to provide a desired signal 114, e.g., a signal containing inertial information, e.g., rate of rotation, about the inertial sensor 110. Optionally, the inertial sensor 110 is in a plane defined by an x-axis X and a y-axis Y. A z-axis Z is orthogonal to such plane. When the inertial sensor 110 is a gyroscope, e.g., a MEMS gyroscope, the desired signal output 117C is configured to provide a desired signal which is a rate of rotation of the inertial sensor 110 around an axis parallel to the z-axis Z.

Figure 3:
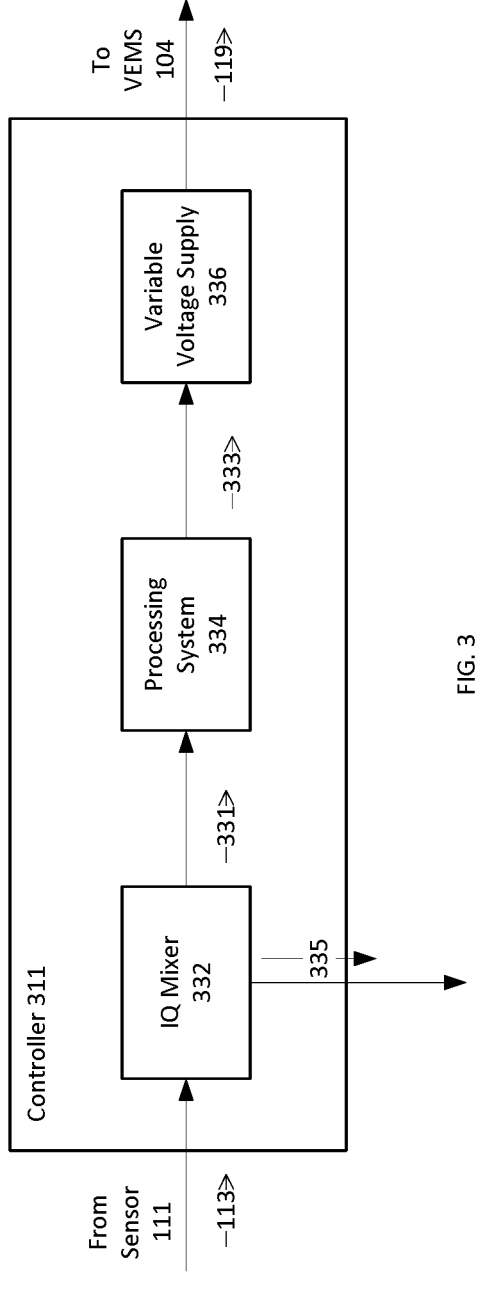
FIG. 3 illustrates a block diagram of one embodiment of an optional controller.

FIG. 3 illustrates a block diagram of one embodiment of the optional controller 311. The optional controller 311 illustrated in FIG. 3 includes an in-phase and quadrature-phase (IQ) mixer 332, a processing system (or processing circuit) 334, and a variable voltage supply. The IQ mixer 332 is configured to receive the measurement signal from the electrical sensor 111, e.g., a current sensor. The IQ mixer 332 is configured to extract a quadrature-phase signal 331 from the measurement signal 118. Optionally, the IQ mixer 332 is further configured to provide an in-phase signal 335 that is a desired signal containing inertial, e.g., rotation rate, information from the inertial sensor 110. The processing system 334 is configured to determine a compensation voltage and to provide a voltage control signal 333 to a variable voltage supply 336; optionally, the processing system 334 may utilize some of the blocks illustrated in FIG. 4 to undertake some or all of the foregoing. The variable voltage supply 336 is configured to generate the compensation signal 119 including the compensation voltage. The voltage level of the compensation signal 119 is configured to adjust the elasticity of the variable elasticity material 224 to adjust the elasticity of the spring-mass system 100 to diminish the quadrature-phase signal 331.

Figure 4:
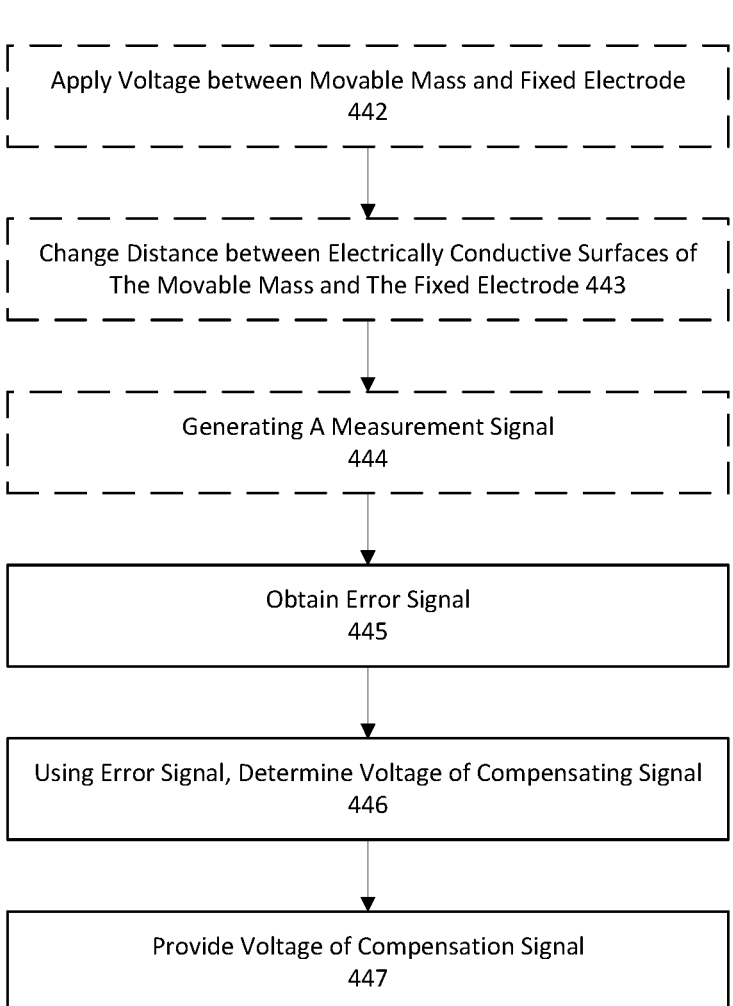
FIG. 4 illustrates a flow diagram of an exemplary method for compensating for an error signal.

FIG. 4 illustrates a flow diagram of an exemplary method 440 for compensating for an error signal, e.g., a quadrature-phase signal, of an inertial sensor, e.g., a gyroscope (for example a MEMS gyroscope). Exemplary method 440 may be implemented by the apparatuses illustrated in FIGS. 1-3. To the extent the methods herein are described herein as being implemented with one or more of the apparatuses illustrated in FIGS. 1-3, it is to be understood that other embodiments can be implemented in other ways. Techniques described with respect to the embodiments illustrated by FIGS. 1-3 may be applicable to the method 440. For example, the methods described herein may be performed by the processing system 334.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In optional block 442, a voltage, e.g., a DC or an AC voltage, is applied between the movable mass (when electrically conductive) or an electrically conductive portion thereof and the fixed electrically conductive electrode. In optional block 443, a distance between opposite and adjacent electrically conductive surfaces of the movable mass or electrically conductive portion and the fixed electrically conductive electrode is changed (or modified), e.g., due to rotation of an inertial sensor, e.g., a gyroscope, around an axis of rotation. In optional block 444, generating a measurement signal, e.g., a current signal derived from current flowing through the capacitor of the inertial sensor.

In block 445, obtain an error signal, e.g., derived from a measurement signal received from an electrical sensor coupled to the capacitor of the inertial sensor. Optionally, the measurement signal is a current signal comprising in-phase and quadrature-phase components.

Figure 5:
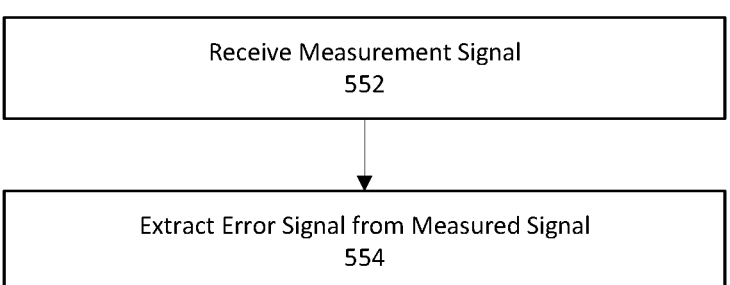
FIG. 5 illustrates a flow diagram of one embodiment of a method of obtaining the error signal.

FIG. 5 illustrates a flow diagram of one embodiment of a method 550 of obtaining the error signal. Other techniques may be used to obtain the error signal.

Exemplary method 550 may be implemented by the apparatuses illustrated in FIGS. 1-3. To the extent the methods herein are described herein as being implemented with one or more of the apparatuses illustrated in FIGS. 1-3, it is to be understood that other embodiments can be implemented in other ways. Techniques described with respect to the embodiments illustrated by FIGS. 1-3 may be applicable to the method 550.

In block 552, a measurement signal is received, e.g., from the sensor (for example, the current sensor). Optionally, the measurement signal is received by the controller 117, e.g., an IQ mixer in the controller.

In block 554, an error signal, e.g., a quadrature-phase signal, is extracted from the measurement signal. Optionally, an in-phase signal, e.g., a sense signal, is also extracted from the measurement signal. Optionally, such extraction(s) are performed by an IQ mixer.

Returning to FIG. 4, in block 446, using the error signal, a voltage, of the compensation signal, is determined. In block 447, the voltage of the compensation signal is provided to a variable elasticity material structure on or over a spring surface, e.g., a beam surface, and/or a movable mass surface. Such compensation voltage is used to diminish an undesired displacement of the spring-mass system by affecting the elasticity of the spring mass system.

FIG. 6 illustrates a flow diagram of one embodiment of a method 660 of determining a voltage of a compensation signal using an error signal, e.g., a quadrature-phase signal. Other techniques may be used to obtain the error signal. Exemplary method 660 may be implemented by the apparatuses illustrated in FIGS. 1-3. To the extent the methods herein are described herein as being implemented with one or more of the apparatuses illustrated in FIGS. 1-3, it is to be understood that other embodiments can be implemented in other ways. Techniques described with respect to the embodiments illustrated by FIGS. 1-3 may be applicable to the method 660.

In block 662, an undesired displacement, $x_{quad}$, of the movable mass from a fixed electrically conductive electrode is determined using the error signal, e.g., an amplitude of a quadrature-phase current signal, $i_{quad}$. Optionally, such undesired displacement is due to manufacturing imperfections in the inertial sensor, e.g., the gyroscope.

Optionally, $$i_{quad} = \frac{\varepsilon_0 A V_Q}{(g - x_{quad})^2} x_{quad} \omega,$$

where A is a cross-sectional area of each of the electrically conductive surface of the fixed electrically conductive electrode and the electrically conductive surface of the movable mass which are adjacent to one another and form the capacitor, $V_Q$ is a voltage across such electrically conductive surfaces of the capacitor. e.g., provided by the voltage source, g is a distance between each of the first and the second electrically conductive surfaces when no error signal is present, e.g., the amplitude of the quadrature-phase current signal is zero, $\varepsilon_0$ is a constant equal to free-space permittivity, and $\omega$ is a frequency (in radians) at which the quadrature-phase current signal is detected. The undesired displacement, $x_{quad}$, may be determined using conventional techniques for solving a quadratic equation.

In block 664, a change in elasticity $\Delta Y$ (or Young's modulus) of the spring-mass system is determined using the undesired displacement of the movable mass.

Optionally, $$\Delta Y = x_{quad}/K,$$

where K is a constant dependent upon geometry and material parameters of each of the movable mass and the spring (e.g., the beam).

In block 666, a voltage Vc of the compensation signal is determined using the change in elasticity of the spring-mass system (e.g., the beam and the movable mass). Such compensation voltage Vc is used to diminish the undesired displacement of the spring-mass system by affecting the elasticity of the spring mass system. Optionally, when the variable elasticity material is ferroelectric material, $$Vc = \left( (E_C - E_0) * \left( \frac{\sqrt{\varepsilon(\Delta Y)} - e_{fixed}}{e_0} \right) + E_0 \right) * t_{AL},$$

where $e_0$ is a switchable polarization of the ferroelectric material, $e_{fixed}$ is a fixed polarization of the ferroelectric material, $\varepsilon$ is dielectric permittivity of the ferroelectric material, $E_C$ is a coercive electric field which is the reverse electric field required to fully switch the switchable polarization to zero, $E_0$ is a threshold electric field which is the minimum reverse electric field to initiate polarization inversion, and $t_{AL}$ (or t as illustrated elsewhere herein) is a thickness of the ferroelectric material.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an error compensated gyroscope configured to measure rotation rate around an axis, the error compensated gyroscope comprising: a gyroscope comprising: a substrate; a spring comprising a first end and a second end, wherein the first end is opposite the second end, wherein the first end is attached to the substrate, and wherein the spring comprises at least one spring surface; a movable mass comprising at least one surface including a first electrically conductive surface, and wherein the movable mass is attached only to the second end, wherein the second end is only attached to the movable mass; a variable elasticity material structure (VEMS) on or over at least one of a surface of the spring and a surface of the movable mass; wherein the variable elasticity material structure comprises variable elasticity material, and first and second VEMS electrically conductive electrodes; a fixed electrically conductive electrode attached to the substrate comprising a second electrically conductive surface, wherein the first electrically conductive surface is adjacent and opposite the second electrically conductive surface and is separated from the second electrically conductive surface by a variable distance, wherein the first and the second electrically conductive surfaces form a capacitor; and a voltage source configured to provide a constant voltage across the first and the second electrically conductive surfaces; and an error correction system comprising: a current sensor electrically coupled in series with the voltage source and the capacitor; and a controller comprising a variable voltage supply and configured to: receive a measurement signal from the current sensor, wherein the measurement signal comprises an in-phase component and a quadrature-phase component; extract the quadrature-phase component from the measurement signal; using the quadrature-phase component, determine a compensation signal voltage; and provide the compensation signal voltage to the first and the second VEMS electrically conductive electrodes.

Example 2 includes the error compensated gyroscope of Example 1, wherein the variable elasticity material comprises at least one of phase change material and ferroelectric material.

Example 3 includes the error compensated gyroscope of any of Examples 1-2, wherein the variable elasticity material structure further comprises another variable elasticity material on or over the variable elasticity material and between the first and the second VEMS electrically conductive electrodes.

Example 4 includes the error compensated gyroscope of any of Examples 1-3, wherein the spring is a beam.

Example 5 includes the error compensated gyroscope of any of Examples 1-4, wherein the first VEMS electrically conductive electrode is on or over the at least one of the surface of the spring and the surface of movable mass; wherein the variable elasticity material is on the first VEMS electrically conductive electrode; wherein the second VEMS electrically conductive electrode is on the variable elasticity material.

Example 6 includes the error compensated gyroscope of any of Examples 1-5, wherein the controller further comprises (a) an in-phase and quadrature-phase mixer configured to extract the quadrature-phase component from the measurement signal and (b) processing circuitry configured to generate a voltage control signal using the quadrature-phase component and to provide the voltage control signal to the variable voltage supply; wherein the variable voltage supply is configured to generate a compensation signal with a voltage determined using the voltage control signal.

Example 7 includes the error compensated gyroscope of any of Examples 1-6, wherein using the quadrature-phase component, determine the compensation signal voltage comprises: using the quadrature-phase component, determining an undesired displacement of the movable mass from the fixed electrically conductive electrode; using the undesired displacement, determining a change in elasticity of the spring and the movable mass; and using the change in the elasticity of the spring and the movable mass, determining the compensation signal voltage.

Example 8 includes the error compensated gyroscope of Example 7, wherein the variable elasticity material consists of ferroelectric material; wherein the undesired displacement, $x_{quad}$, is determined using $$i_{quad} = \frac{\varepsilon_0 A V_Q}{(g - x_{quad})^2} x_{quad}\omega,$$

where $i_{quad}$ is an amplitude of a quadrature-phase current signal, A is a cross-sectional area of each of the first and the second electrically conductive surfaces, $V_Q$ is a voltage across the first and the second electrically conductive surfaces which the voltage source is configured to provide, g is a distance between such first and second electrically conductive surfaces when the amplitude of the quadrature-phase current signal is zero, $\varepsilon_0$ is a constant equal to free-space permittivity, and $\omega$ is a frequency in radians at which the quadrature-phase current signal is detected; wherein determining the change in the elasticity, $\Delta Y$, of the spring and the movable mass is determined using $$\Delta Y = x_{quad}/K,$$

where K is a constant dependent upon a geometry and material parameters of each of the movable mass and the spring; wherein determining the compensation signal voltage, Vc, is determined using $$Vc = \left((E_C - E_0) * \left(\frac{\sqrt{\varepsilon(\Delta Y)} - e_{fixed}}{e_0}\right) + E_0\right) * t_{AL},$$

where $e_0$ is a switchable polarization of the ferroelectric material, $e_{fixed}$ is a fixed polarization of the ferroelectric material, $\varepsilon$ is dielectric permittivity of the ferroelectric material, $E_C$ is a coercive electric field which is a reverse electric field required to fully switch the switchable polarization to zero, $E_0$ is a threshold electric field which is a minimum reverse electric field to initiate polarization inversion, and $t_{AL}$ is a thickness of the ferroelectric material.

Example 9 includes a method for compensating for an error signal in a gyroscope, the method comprising: obtaining a quadrature-phase signal derived from a measurement signal received from a current sensor coupled in series with a capacitor and a voltage source, wherein the capacitor is formed by a first electrically conductive surface of a movable mass, comprising at least one surface, and comprising a second electrically conductive surface of a fixed electrically conductive electrode attached to a substrate, wherein the first and the second electrically conductive surfaces are opposite and adjacent to one another and separated from one another by a variable distance, wherein the movable mass is attached only to a second end of a spring, wherein the second end is only attached to the movable mass, wherein a first end of the spring is opposite the second end, wherein the first end is attached to the substrate, wherein the spring comprises at least one spring surface, and wherein a variable elasticity material structure (VEMS) comprises a variable elasticity material and first and second VEMS electrically conductive electrodes and is on or over at least one of a surface of the spring and a surface of the movable mass; using the quadrature-phase signal, determining a compensation signal voltage; and providing the compensation signal voltage to the first and the second VEMS electrically conductive electrodes.

Example 10 includes the method of Example 9, wherein obtaining the quadrature-phase signal comprises: receiving the measurement signal; and extracting the quadrature-phase signal from the measurement signal with an I-Q mixer.

Example 11 includes the method of any of Examples 9-10, further comprising: applying a voltage between the first electrically conductive surface of the movable mass and the fixed electrically conductive electrode; changing a distance between the first and the second electrically conductive surfaces; and generating the measurement signal derived from a current flowing through the capacitor.

Example 12 includes the method of any of Examples 9-11, wherein the spring is a beam.

Example 13 includes the method of any of Examples 9-12, wherein determining the compensation signal voltage comprises: using the quadrature-phase signal, determining an undesired displacement of the movable mass from the fixed electrically conductive electrode; using the undesired displacement, determining a change in elasticity of the spring and the movable mass; and using the change in the elasticity of the spring and the movable mass, determining the compensation signal voltage.

Example 14 includes the method of Example 13, wherein the variable elasticity material consists of ferroelectric material; wherein the undesired displacement, $x_{quad}$, is determined using $$i_{quad} = \frac{\varepsilon_0 A V_Q}{(g - x_{quad})^2} x_{quad} \omega,$$

where $i_{quad}$ is an amplitude of a quadrature-phase current signal, A is a cross-sectional area of each of the first and the second electrically conductive surfaces, $V_Q$ is a voltage across the first and the second electrically conductive surfaces provided by the voltage source, g is a distance between the first and the second electrically conductive surfaces when the amplitude of the quadrature-phase current signal is zero, $\varepsilon_0$ is a constant equal to free-space permittivity, and $\omega$ is a frequency in radians at which the quadrature-phase current signal is detected; wherein determining the change in the elasticity, $\Delta Y$, of the spring and the movable mass is determined using $$\Delta Y = x_{quad}/K,$$

where K is a constant dependent upon a geometry and material parameters of each of the movable mass and the spring; wherein determining the compensation signal voltage, Vc, is determined using $$Vc = \left( (E_C - E_0) * \left( \frac{\sqrt{\varepsilon(\Delta Y)} - e_{fixed}}{e_0} \right) + E_0 \right) * t_{AL},$$

where $e_0$ is a switchable polarization of the ferroelectric material, $e_{fixed}$ is a fixed polarization of the ferroelectric material, $\varepsilon$ is dielectric permittivity of the ferroelectric material, $E_C$ is a coercive electric field which is a reverse electric field required to fully switch the switchable polarization to zero, $E_0$ is a threshold electric field which is a minimum reverse electric field to initiate polarization inversion, and $t_{AL}$ is a thickness of the ferroelectric material.

Example 15 includes an apparatus configured to resonate at more than one frequency, the apparatus comprising: a substrate; a beam comprising a first end and a second end, wherein the first end is opposite the second end, wherein the first end is attached to the substrate, wherein the beam comprises at least one beam surface; a movable mass only attached to the second end and comprising at least one mass surface, wherein the second end is only attached to the movable mass; and a variable elasticity material structure comprising: at least one of phase change material and ferroelectric material on or over at least one of a surface of the beam and a surface of the movable mass; and two electrically conductive electrodes, on at least one surface of the at least one phase change material and ferroelectric material and configured to receive an electrical voltage that is constant or variable.

Example 16 includes the apparatus of Example 15, further comprising another of at least one of phase change material and ferroelectric material on or over the at least one of phase change material and ferroelectric material.

Example 17 includes the apparatus of any of Examples 15-16, further comprising: a fixed electrically conductive electrode attached to the substrate comprising a second electrically conductive surface, wherein a first electrically conductive surface of the movable mass is adjacent and opposite the second electrically conductive surface and is separated from the second electrically conductive surface by a variable distance, wherein the first and the second electrically conductive surfaces form a capacitor; a voltage source configured to provide a constant voltage across the first and the second electrically conductive surfaces; and an error correction system comprising: a current sensor electrically coupled in series with the voltage source and the capacitor; and a controller comprising a variable voltage supply and configured to: receive a measurement signal from the current sensor, wherein the measurement signal comprises an in-phase component and a quadrature-phase component; extract the quadrature-phase component from the measurement signal; using the quadrature-phase component, determine a compensation signal voltage; and provide the compensation signal voltage to the two electrically conductive electrodes of the variable elasticity material structure.

Example 18 includes the apparatus of Example 17, wherein the controller further comprises (a) an in-phase and quadrature-phase mixer configured to extract the quadrature-phase component from the measurement signal and (b) processing circuitry configured to generate a voltage control signal using the quadrature-phase component and to provide the voltage control signal to the variable voltage supply; wherein the variable voltage supply is configured to generate a compensation signal with a voltage determined using the voltage control signal.

Example 19 includes the apparatus of any of Examples 17-18, wherein using the quadrature-phase component, determine the compensation signal voltage comprises: using the quadrature-phase component, determining an undesired displacement of the movable mass from the fixed electrically conductive electrode; using the undesired displacement, determining a change in elasticity of the beam and the movable mass; and using the change in the elasticity of the beam and the movable mass, determining the compensation signal voltage.

Example 20 includes the apparatus of Example 19, wherein the variable elasticity material consists of ferroelectric material; wherein the undesired displacement, $x_{quad}$, is determined using $$i_{quad} = \frac{\varepsilon_0 A V_Q}{(g - x_{quad})^2} x_{quad} \omega,$$

where $i_{quad}$ is an amplitude of a quadrature-phase current signal, A is a cross-sectional area of each of the first and the second electrically conductive surfaces, $V_Q$ is a voltage across the first and the second electrically conductive surfaces which the voltage source is configured to provide, g is a distance between the first and the second electrically conductive surfaces when the amplitude of the quadrature-phase current signal is zero, $\varepsilon_0$ is a constant equal to free-space permittivity, and $\omega$ is a frequency in radians at which the quadrature-phase current signal is detected; wherein determining the change in the elasticity, $\Delta Y$, of the beam and the movable mass is determined using $$\Delta Y = x_{quad}/K,$$

where K is a constant dependent upon a geometry and material parameters of each of the movable mass and the beam; wherein determining the compensation signal voltage, Vc, is determined using $$Vc = \left( (E_C - E_0) * \left( \frac{\sqrt{\varepsilon(\Delta Y)} - e_{fixed}}{e_0} \right) + E_0 \right) * t_{AL},$$

where $e_0$ is a switchable polarization of the ferroelectric material, $e_{fixed}$ is a fixed polarization of the ferroelectric material, $\varepsilon$ is dielectric permittivity of the ferroelectric material, $E_C$ is a coercive electric field which is a reverse electric field required to fully switch the switchable polarization to zero, $E_0$ is a threshold electric field which is a minimum reverse electric field to initiate polarization inversion, and $t_{AL}$ is a thickness of the ferroelectric material.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An error compensated gyroscope configured to measure rotation rate around an axis, the error compensated gyroscope comprising:
   a gyroscope comprising:
      a substrate;
      a spring comprising a first end and a second end, wherein the first end is opposite the second end, wherein the first end is attached to the substrate, and wherein the spring comprises at least one spring surface;

a movable mass comprising at least one surface including a first electrically conductive surface, and wherein the movable mass is attached only to the second end, wherein the second end is only attached to the movable mass;
   a variable elasticity material structure (VEMS) on or over at least one of a surface of the spring and a surface of the movable mass;
   wherein the variable elasticity material structure comprises variable elasticity material, and first and second VEMS electrically conductive electrodes;
   a fixed electrically conductive electrode attached to the substrate comprising a second electrically conductive surface, wherein the first electrically conductive surface is adjacent and opposite the second electrically conductive surface and is separated from the second electrically conductive surface by a variable distance, wherein the first and the second electrically conductive surfaces form a capacitor; and
   a voltage source configured to provide a constant voltage across the first and the second electrically conductive surfaces; and
   an error correction system comprising:
      a current sensor electrically coupled in series with the voltage source and the capacitor; and
      a controller comprising a variable voltage supply and configured to:
         receive a measurement signal from the current sensor, wherein the measurement signal comprises an in-phase component and a quadrature-phase component;
         extract the quadrature-phase component from the measurement signal;
         using the quadrature-phase component, determine a compensation signal voltage; and
         provide the compensation signal voltage to the first and the second VEMS electrically conductive electrodes.

2. The error compensated gyroscope of claim 1, wherein the variable elasticity material comprises at least one of phase change material and ferroelectric material.

3. The error compensated gyroscope of claim 1, wherein the variable elasticity material structure further comprises another variable elasticity material on or over the variable elasticity material and between the first and the second VEMS electrically conductive electrodes.

4. The error compensated gyroscope of claim 1, wherein the spring is a beam.

5. The error compensated gyroscope of claim 1, wherein the first VEMS electrically conductive electrode is on or over the at least one of the surface of the spring and the surface of movable mass;
   wherein the variable elasticity material is on the first VEMS electrically conductive electrode;
   wherein the second VEMS electrically conductive electrode is on the variable elasticity material.

6. The error compensated gyroscope of claim 1, wherein the controller further comprises (a) an in-phase and quadrature-phase mixer configured to extract the quadrature-phase component from the measurement signal and (b) processing circuitry configured to generate a voltage control signal using the quadrature-phase component and to provide the voltage control signal to the variable voltage supply;
   wherein the variable voltage supply is configured to generate a compensation signal with a voltage determined using the voltage control signal.

7. The error compensated gyroscope of claim 1, wherein using the quadrature-phase component, determine the compensation signal voltage comprises:

using the quadrature-phase component, determining an undesired displacement of the movable mass from the fixed electrically conductive electrode;

using the undesired displacement, determining a change in elasticity of the spring and the movable mass; and using the change in the elasticity of the spring and the movable mass, determining the compensation signal voltage.

8. The error compensated gyroscope of claim 7, wherein the variable elasticity material consists of ferroelectric material;

wherein the undesired displacement, $x_{quad}$, is determined using $$i_{quad} = \frac{\varepsilon_0 A V_Q}{(g - x_{quad})^2} x_{quad}\omega,$$

where $i_{quad}$ is an amplitude of a quadrature-phase current signal, A is a cross-sectional area of each of the first and the second electrically conductive surfaces, $V_Q$ is a voltage across the first and the second electrically conductive surfaces which the voltage source is configured to provide, g is a distance between such first and second electrically conductive surfaces when the amplitude of the quadrature-phase current signal is zero, $\varepsilon_0$ is a constant equal to free-space permittivity, and $\omega$ is a frequency in radians at which the quadrature-phase current signal is detected;

wherein determining the change in the elasticity, $\Delta Y$, of the spring and the movable mass is determined using $$\Delta Y = x_{quad}/K,$$

where K is a constant dependent upon a geometry and material parameters of each of the movable mass and the spring;

wherein determining the compensation signal voltage, Vc, is determined using $$Vc = \left( (E_C - E_0) * \left( \frac{\sqrt{\varepsilon(\Delta Y)} - e_{fixed}}{e_0} \right) + E_0 \right) * t_{AL},$$

where $e_0$ is a switchable polarization of the ferroelectric material, $e_{fixed}$ is a fixed polarization of the ferroelectric material, $\varepsilon$ is dielectric permittivity of the ferroelectric material, $E_C$ is a coercive electric field which is a reverse electric field required to fully switch the switchable polarization to zero, $E_0$ is a threshold electric field which is a minimum reverse electric field to initiate polarization inversion, and $t_{AL}$ is a thickness of the ferroelectric material.

9. A method for compensating for an error signal in a gyroscope, the method comprising:

obtaining a quadrature-phase signal derived from a measurement signal received from a current sensor coupled in series with a capacitor and a voltage source, wherein the capacitor is formed by a first electrically conductive surface of a movable mass, comprising at least one surface, and comprising a second electrically conductive surface of a fixed electrically conductive electrode attached to a substrate, wherein the first and the second electrically conductive surfaces are opposite and adjacent to one another and separated from one another by a variable distance, wherein the movable mass is attached only to a second end of a spring, wherein the second end is only attached to the movable mass, wherein a first end of the spring is opposite the second end, wherein the first end is attached to the substrate, wherein the spring comprises at least one spring surface, and wherein a variable elasticity material structure (VEMS) comprises a variable elasticity material and first and second VEMS electrically conductive electrodes and is on or over at least one of a surface of the spring and a surface of the movable mass;

using the quadrature-phase signal, determining a compensation signal voltage; and providing the compensation signal voltage to the first and the second VEMS electrically conductive electrodes.

10. The method of claim 9, wherein obtaining the quadrature-phase signal comprises:

receiving the measurement signal; and extracting the quadrature-phase signal from the measurement signal with an I-Q mixer.

11. The method of claim 9, further comprising:

applying a voltage between the first electrically conductive surface of the movable mass and the fixed electrically conductive electrode;

changing a distance between the first and the second electrically conductive surfaces; and generating the measurement signal derived from a current flowing through the capacitor.

12. The method of claim 9, wherein the spring is a beam.

13. The method of claim 9, wherein determining the compensation signal voltage comprises:

using the quadrature-phase signal, determining an undesired displacement of the movable mass from the fixed electrically conductive electrode;

using the undesired displacement, determining a change in elasticity of the spring and the movable mass; and using the change in the elasticity of the spring and the movable mass, determining the compensation signal voltage.

14. The method of claim 13, wherein the variable elasticity material consists of ferroelectric material;

wherein the undesired displacement, $x_{quad}$, is determined using $$i_{quad} = \frac{\varepsilon_0 A V_Q}{(g - x_{quad})^2} x_{quad}\omega,$$

where $i_{quad}$ is an amplitude of a quadrature-phase current signal, A is a cross-sectional area of each of the first and the second electrically conductive surfaces, $V_Q$ is a voltage across the first and the second electrically conductive surfaces provided by the voltage source, g is a distance between the first and the second electrically conductive surfaces when the amplitude of the quadrature-phase current signal is zero, $\varepsilon_0$ is a constant equal to free-space permittivity, and $\omega$ is a frequency in radians at which the quadrature-phase current signal is detected;

wherein determining the change in the elasticity, $\Delta Y$, of the spring and the movable mass is determined using, $$\Delta Y = x_{quad}/K,$$

where K is a constant dependent upon a geometry and material parameters of each of the movable mass and the spring;

wherein determining the compensation signal voltage, Vc, is determined using $$Vc = \left( (E_C - E_0) * \left( \frac{\sqrt{\varepsilon(\Delta Y)} - e_{fixed}}{e_0} \right) + E_0 \right) * t_{AL},$$

where $e_0$ is a switchable polarization of the ferroelectric material, $e_{fixed}$ is a fixed polarization of the ferroelectric material, $\varepsilon$ is dielectric permittivity of the ferroelectric material, $E_C$ is a coercive electric field which is a reverse electric field required to fully switch the switchable polarization to zero, $E_0$ is a threshold electric field which is a minimum reverse electric field to initiate polarization inversion, and $t_{AL}$ is a thickness of the ferroelectric material.

15. An apparatus configured to resonate at more than one frequency, the apparatus comprising:

a substrate;

a beam comprising a first end and a second end, wherein the first end is opposite the second end, wherein the first end is attached to the substrate, wherein the beam comprises at least one beam surface;

a movable mass only attached to the second end and comprising at least one mass surface, wherein the second end is only attached to the movable mass;

a variable elasticity material structure comprising:

at least one of phase change material and ferroelectric material on or over at least one of a surface of the beam and a surface of the movable mass; and two electrically conductive electrodes, on at least one surface of the at least one phase change material and ferroelectric material and configured to receive an electrical voltage that is constant or variable;

a fixed electrically conductive electrode attached to the substrate comprising a second electrically conductive surface, wherein a first electrically conductive surface of the movable mass is adjacent and opposite the second electrically conductive surface and is separated from the second electrically conductive surface by a variable distance, wherein the first and the second electrically conductive surfaces form a capacitor;

a voltage source configured to provide a constant voltage across the first and the second electrically conductive surfaces; and an error correction system comprising:

a current sensor electrically coupled in series with the voltage source and the capacitor; and a controller comprising a variable voltage supply and configured to:

receive a measurement signal from the current sensor, wherein the measurement signal comprises an in-phase component and a quadrature-phase component;

extract the quadrature-phase component from the measurement signal;

using the quadrature-phase component, determine a compensation signal voltage; and provide the compensation signal voltage to the two electrically conductive electrodes of the variable elasticity material structure.

16. The apparatus of claim 15, further comprising another of at least one of phase change material and ferroelectric material on or over the at least one of phase change material and ferroelectric material.

17. The apparatus of claim 15, wherein the controller further comprises (a) an in-phase and quadrature-phase mixer configured to extract the quadrature-phase component from the measurement signal and (b) processing circuitry configured to generate a voltage control signal using the quadrature-phase component and to provide the voltage control signal to the variable voltage supply;

wherein the variable voltage supply is configured to generate a compensation signal with a voltage determined using the voltage control signal.

18. The apparatus of claim 15, wherein using the quadrature-phase component, determine the compensation signal voltage comprises:

using the quadrature-phase component, determining an undesired displacement of the movable mass from the fixed electrically conductive electrode;

using the undesired displacement, determining a change in elasticity of the beam and the movable mass; and using the change in the elasticity of the beam and the movable mass, determining the compensation signal voltage.

19. The apparatus of claim 18, wherein the variable elasticity material consists of ferroelectric material;

wherein the undesired displacement, $x_{quad}$, is determined using $$i_{quad} = \frac{\varepsilon_0 A V_Q}{(g - x_{quad})^2} x_{quad} \omega,$$

where $i_{quad}$ is an amplitude of a quadrature-phase current signal, A is a cross-sectional area of each of the first and the second electrically conductive surfaces, $V_Q$ is a voltage across the first and the second electrically conductive surfaces which the voltage source is configured to provide, g is a distance between the first and the second electrically conductive surfaces when the amplitude of the quadrature-phase current signal is zero, $\varepsilon_0$ is a constant equal to free-space permittivity, and $\omega$ is a frequency in radians at which the quadrature-phase current signal is detected;

wherein determining the change in the elasticity, $\Delta Y$, of the beam and the movable mass is determined using $$\Delta Y = x_{quad}/K,$$

where K is a constant dependent upon a geometry and material parameters of each of the movable mass and the beam;

wherein determining the compensation signal voltage, Vc, is determined using $$Vc = \left( (E_C - E_0) * \left( \frac{\sqrt{\varepsilon(\Delta Y)} - e_{fixed}}{e_0} \right) + E_0 \right) * t_{AL},$$

where $e_0$ is a switchable polarization of the ferroelectric material, $e_{fixed}$ is a fixed polarization of the ferroelectric material, $\varepsilon$ is dielectric permittivity of the ferroelectric material, $E_C$ is a coercive electric field which is a reverse electric field required to fully switch the switchable polarization to zero, $E_0$ is a threshold electric field which is a minimum reverse electric field to initiate polarization inversion, and $t_{AL}$ is a thickness of the ferroelectric material.

* * * * *